United States Patent [19]

Debost et al.

[11] 3,891,947

[45] June 24, 1975

[54] CIRCUIT ARRANGEMENT FOR ADAPTING A LOAD NETWORK TO A TRANSCEIVER

[75] Inventors: Jean-Pierre Debost, Versailles; Jacques Mezan de Malartic, Antony, both of France

[73] Assignee: U.S. Philips Corporation, New York, N.Y.

[22] Filed: Oct. 23, 1973

[21] Appl. No.: 408,403

[30] Foreign Application Priority Data

Oct. 31, 1972 France ............................. 72.38590

[52] U.S. Cl. .................... 333/17; 325/187; 333/32; 334/47

[51] Int. Cl. ............................................. H03h 7/40

[58] Field of Search ........... 333/17, 32; 334/47, 55, 334/56, 65, 69; 325/174, 175, 177, 187

[56] References Cited

UNITED STATES PATENTS

| | | | |
|---|---|---|---|
| 3,509,500 | 4/1970 | McNair et al. | 333/17 X |
| 3,643,163 | 2/1972 | Bruck | 333/17 UX |
| 3,778,731 | 12/1973 | Oomen | 333/17 |
| 3,794,941 | 2/1974 | Templin | 333/17 |

OTHER PUBLICATIONS

IRE Dictionary – The Institute of Radio Engineers, Inc., New York 1961; Title Page and Page 102.

*Primary Examiner*—James W. Lawrence
*Assistant Examiner*—Marvin Nussbaum
*Attorney, Agent, or Firm*—Frank R. Trifari; Henry I. Steckler

[57] ABSTRACT

As a result of using a resistance discriminator and a conductance discriminator and by the choice of the circuit arrangement of two adjustable reactive elements adjustment is obtained in two distinct control phases. One reactive element is adjusted during a first phase in accordance with information supplied by one of said discriminators in accordance with the impedance of the load network while during a second phase the other reactive element is advantageously adjusted in accordance with information supplied by a phase discriminator. Use: adaptation of an aerial to a transceiver for radio-telecommunication (reference: FIG. 1).

6 Claims, 4 Drawing Figures

CIRCUIT ARRANGEMENT FOR ADAPTING A LOAD NETWORK TO A TRANSCEIVER

The invention relates to an arrangement for adapting a load network to a transceiver, comprising a load adaptor having a first and a second adjustable reactive element, switching means and at least a first and a second control means.

Arrangements of the kind described above are used inter alia to adapt an aerial to a transceiver on board a vehicle because in that case the impedance of the aerial varies in accordance with different parameters, such as (environment, transmission frequency, distortion of the aerial as a function of the speed of the vehicle, and so on).

A known arrangement is described in French Pat. Specification No. 1207566 filed by the Applicant on 26th of June 1958. In this arrangement the adaptation is effected by an iterative process, i.e., by successive approximations which may take too much time to obtain a satisfactory use of the transceiver.

The object of the invention is to improve this known arrangement so as to obtain a quicker adaptation.

The present invention provides an arrangement for adapting a load network to a transceiver, in which in the presence of a first information indicating at least the fact that the resistance of the load network is higher than that of the transceiver, the switching elements connect the first reactive element in series with the load network which is connected in parallel with the second reactive element and permit the second control means to vary the susceptance of the second reactive element during a first control phase until the real part of the impedance at the input terminal of the arrangement is substantially equal to the resistance of the transceiver, while during a second control phase a control means other than that used during the first control phase ensures the adjustment of the first reactive element, whereas in the presence of a second information indicating at least the fact that the conductance of the load network is higher than that of the transceiver the switching elements connect the second reactive element in parallel with the first reactive element which is in series with the load network and permit the first control means to vary the reactance of said first reactive element during the first control phase until the real part of the admittance at the input terminals of the arrangement is substantially equal to the conductance of the transceiver while during the second control phase a control means other than that used during the first phase ensures the adjustment of the second reactive element.

The invention will be described in greater detail with reference to the accompanying Figures.

Figure 1:
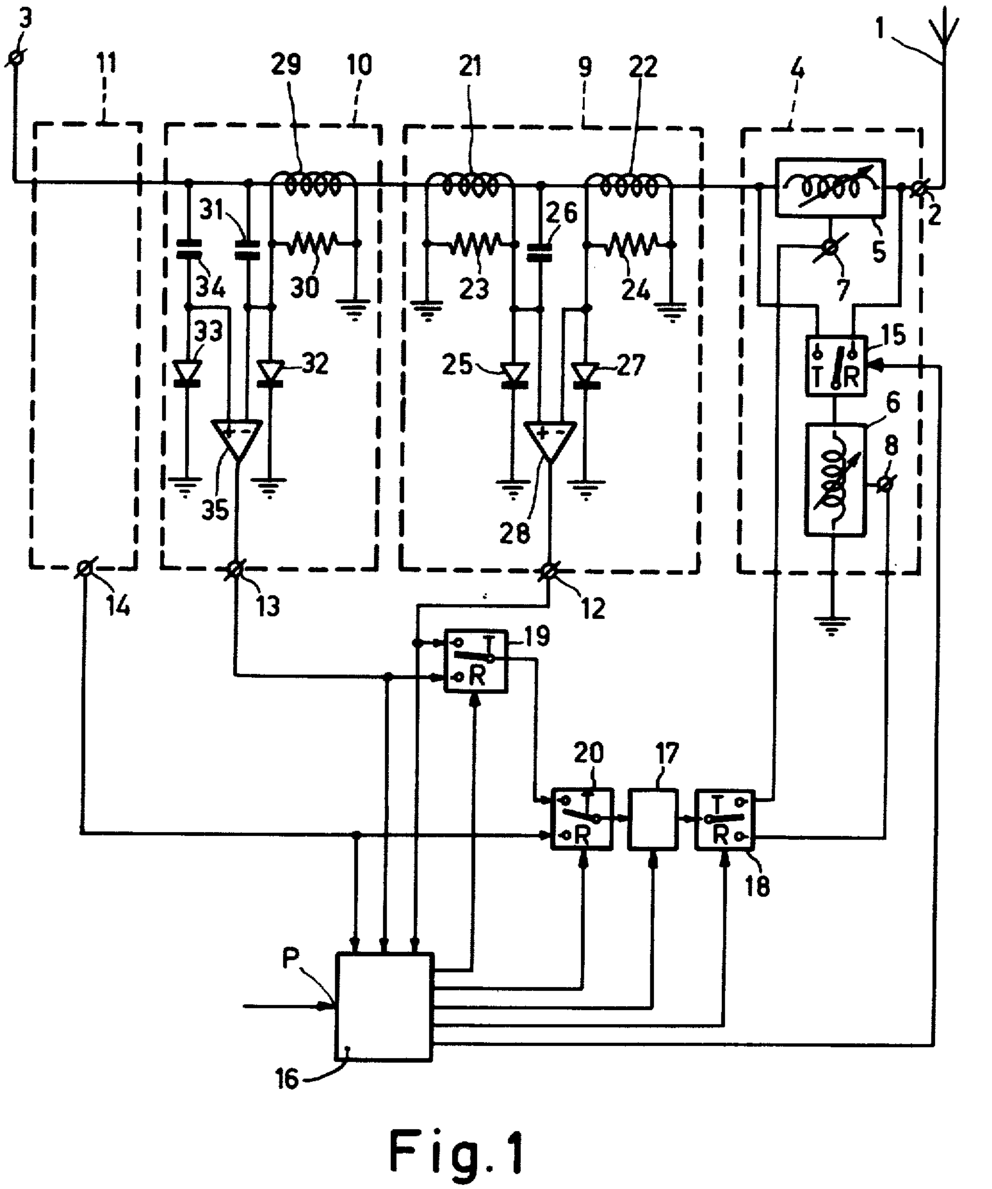
FIG. 1 shows an arrangement according to the invention

In FIG. 1 the load network is constituted by an aerial connected to the output terminal 2 of the arrangement. A transceiver which is not shown in the Figure is connected to the input terminal 3. The aerial 1 serves both for transmission and for reception. During transmission the transceiver behaves as a voltage generator in series with a resistor whose value must be substantially equal to the characteristic impedance $R_o$ of the coaxial cable connecting the transceiver to the arrangement. In case of reception the transceiver behaves as a resistor whose value is likewise substantially equal to the characteristic impedance of said coaxial cable. As regards adaptation the resistor $R_o$ (not shown in the Figure) is arranged between terminal 3 and ground whatever the length of the cable between this terminal and the transceiver and whatever the operation of the station (transmission or reception).

The reference numeral 4 denotes the load adaptor which comprises first and second "reactive" elements 5 and 6. An inductor having a wiper which is displaced by a motor is present between the ends of these elements. Alternatively a variable capacity diode may be used. The elements 5 and 6 have adjusting terminals 7 and 8, respectively. These adjusting terminals receive voltages determining the rotation of the motor. When using a variable capacity diode the control terminal receives the bias.

By variation of the values of these reactive elements the load adaptor can provide an impedance between terminal 3 and ground which is substantially equal to $R_o$ while an arbitrary impedance is arranged between terminal 2 and ground.

Different discriminators 9, 10 and 11 whose operation will be further described provide signals at output terminals 12, 13 and 14 which represent the modules and the phase of the voltages and of the current at terminal 3.

According to the invention the switching elements connect the first reactive element 5 in series with the load network which is arranged in parallel with the second reactive element 6 in the presence of a first piece of information which indicates that the resistance of the load network is higher than $R_o$. This is obtained by means of a switch 15 in the position R which switch is controlled by a signal derived from a mode selecting circuit 16 receiving at its input P a signal which is representative of the first piece of information supplied by the user.

When this connection is established the element 6 is adjusted during the first control phase. To this end the terminal 8 is connected to the output of an adjusting member 17 by means of a switch 18 in the position R. In this case the adjusting member is constituted by a power amplifier while the input of said member 17 is connected to the output terminal 13 of a "resistance discriminator" 10 by means of a switch 19 in the position R and a switch 20 in the position T. The switches 18, 19 and 20 are controlled by signals which are supplied by the mode selecting circuit 16.

The member 17 serves for supplying the voltage which is necessary for adjusting the reactive elements as a function of the information supplied by the discriminators, i.e., this member 17 must supply a given power while its discriminators apply voltages at its input which are generally unsuitable for the supply of power. This member may receive blocking signals so as to cut off its supply circuit.

Reactive element 6 is adjusted until the real part of the impedance at the input terminal 3 is substantially equal to the resistance of the transceiver.

The signal indicating this equality and being present at the terminal 13 connected to the control circuit 16 causes the switch 18 to vary to the position T. The terminal 7 is then connected to the output of member 17 while the input of this member is connected to terminal 12. The switches 19 and 20 are then operated to set them in the position T.

During the second control phase the adaptation is obtained by adjusting the element 5 in accordance with information provided by a conductance discriminator 9 whose output terminal 12 is connected to an input of the circuit 16 which applies a blocking signal to the member 17 upon reception of the signal indicating that the adaptation is effected so that no voltage appears at the output and the element 5 maintains its value.

In the presence of a second information indicating that the conductance is higher than $1/R_o$ the switching elements connect the second reactive element 6 in parallel with the combination of the first element 5 which is arranged in series with the load network. This is effected by the switch 15 in position T under the control of the circuit 16.

At the same time in order to carry out the relevant first control phase the adjusting terminal 7 is connected to the output of the member 17 by means of the switch 18 in the position T while the input of the member 17 is connected to the output terminal 12 of the "conductance discriminator" 9 by means of the switches 19 and 20 in position T. During this first control phase the reactive element 5 is adjusted in accordance with information provided by discriminator 9 until the real part of the admittance between the input terminal 3 and ground is substantially equal to the conductance of the transceiver.

The signal indicating this equality discontinues this first control phase and causes the position of the switch 18 to change to the position R by means of the circuit 16 an input of which is connected to the terminal 12. It also causes the switch 19 to change to the position R so that the input of the member 17 is connected to the output terminal 13 of the resistance discriminator 10. The adaptation then ends during the second tuning phase which consists of adjusting the reactive element 6 until the discriminator 10 indicates that the adaptation is obtained while the circuit 16 applies the blocking signal to the member 17.

When the resistance and the conductance of the load network are lower than the resistance and the conductance of the transceiver, the adaptation may be obtained either by carrying out the first and the second control phases successively or carrying out the further first and second control phases successively.

In a preferred embodiment of the invention a phase discriminator 11 is used for the final adaptation during the second control phases. This is achieved by connecting the input of the member 17 at the end of the relevant first control phase to the output terminal 14 of this discriminator 11 by means of a switch 20 in the position R.

This phase discriminator applies a voltage to an output which represents the difference in phase between the current and the voltage at the terminal 3.

In this embodiment the switches 15 and 19 cooperate and their position is unchanged during the two successive control phases.

A "conductance discriminator" may be defined as a circuit which provides a positive or negative voltage when the real part of the admittance at the terminal 3 is larger or smaller than the conductance of the transceiver.

Conductance discriminator 9 has two equal coils 21 and 22 which are inductively coupled with the connection wire connected to the terminal 3. Connected in parallel with these coils there are the resistors 23 and 24 of a value $r_c$. A voltage $e$ is obtained across these coils which voltage is proportional to the current I flowing through said connection wire. The voltage $e$ can be expressed in the following equation:

$$e = k\, r_c I$$

in which $k$ is a proportionality factor.

The cathode of a diode 25 is connected on the one hand to one end of coil 21 (the other end of this coil being connected to ground) and on the other hand to a terminal of a capacitor 26 the other terminal of which is connected to the said connection wire. The anode of diode 25 is connected to ground. Thus arranged, this diode detects a voltage E which may be written as:

$$E = k'\, V - k\, r_c I$$

in which V denotes the voltage between terminal 3 and ground; the factor $k'$ is determined by the value of the capacitor 26. A second diode 27 detects the voltage $e$ across coil 22.

These rectified voltages $e$ and E are applied to the two inputs (+) and (−) of a difference amplifier 28 which compares the modules of the voltages $e$ and E.

The output voltage of this amplifier is zero when:

$$|E| = |e|$$

which corresponds to a vector equation of the form:

$$= |2\, G_o\vec{V} - \vec{I}| = |\vec{I}| \qquad 1$$

By adjusting $k'$ and by choosing $r_c$ it is achieved that $G_o = 1/R_o$. When Y is the admittance of the load network at the level of the terminal 3 the solution of this equation (1) is:

$$\mathcal{R}(Y) = 1/R_o$$

in which $\mathcal{R}(\ldots)$ means that the real part of the element between parenthesis is considered.

The output voltage will be positive or negative as $\mathcal{R}(Y)$ is larger or smaller than $1/R_o$.

A "resistance discriminator" may be defined as a circuit supplying a positive or negative voltage when the real part of the load impedance is larger or smaller than the internal resistance of the transceiver. Resistance discriminator 10 has a coil 29 which is equal to the coils 21 and 22 and is arranged in parallel with a resistor 30 whose value is $r_c$. Across coil 29 a voltage $e'$ is obtained:

$$e' = k''\, r_c I$$

Discriminator 10 also includes a capacitor 31 one end of which is connected to the said connection wire while the cathode of a first diode 32 is connected on the one hand to one end of the coil 29 and on the other hand to the other end of capacitor 31. Arranged in this manner, this diode detects a voltage E':

$$E' = k'''\, V - k''\, r_c I$$

in which $k'''$ is a proportionality factor which is mainly determined by the value of capacitor 31.

A second diode 33 which is arranged between ground and a terminal of a capacitor 34 the other terminal of which is connected to the connection wire connected to the terminal 3 rectifies a voltage $e''$:

$$e'' = k^{IV} V$$

in which $k^{IV}$ is a proportionality factor which is determined inter alia by the value of capacitor 34.

The two inputs (−) and (+) of the difference amplifier 35 connected to the cathode of the diodes 33 and 32, respectively, make a comparison between the modules E' and $e''$ possible. The output voltage of the difference amplifier 25 is zero when $$|E'| = |e''|$$

which corresponds to a vector equation of the form:

$$|2\,\overrightarrow{R'_o I} - \vec{V}| = |\vec{V}| \qquad 2$$

By proper choice of the values of the different proportionality coefficients it is achieved that $R'_o = R_o$. When Z is assumed to be the impedance of the load network at the level of terminal 3 the solution of this equation (2) then is:

$$\mathcal{R}(Z) = R_o$$

A positive or negative voltage dependent on whether R(Z) is larger or smaller than $R_o$ is obtained at the output terminal 13.

Figure 2:
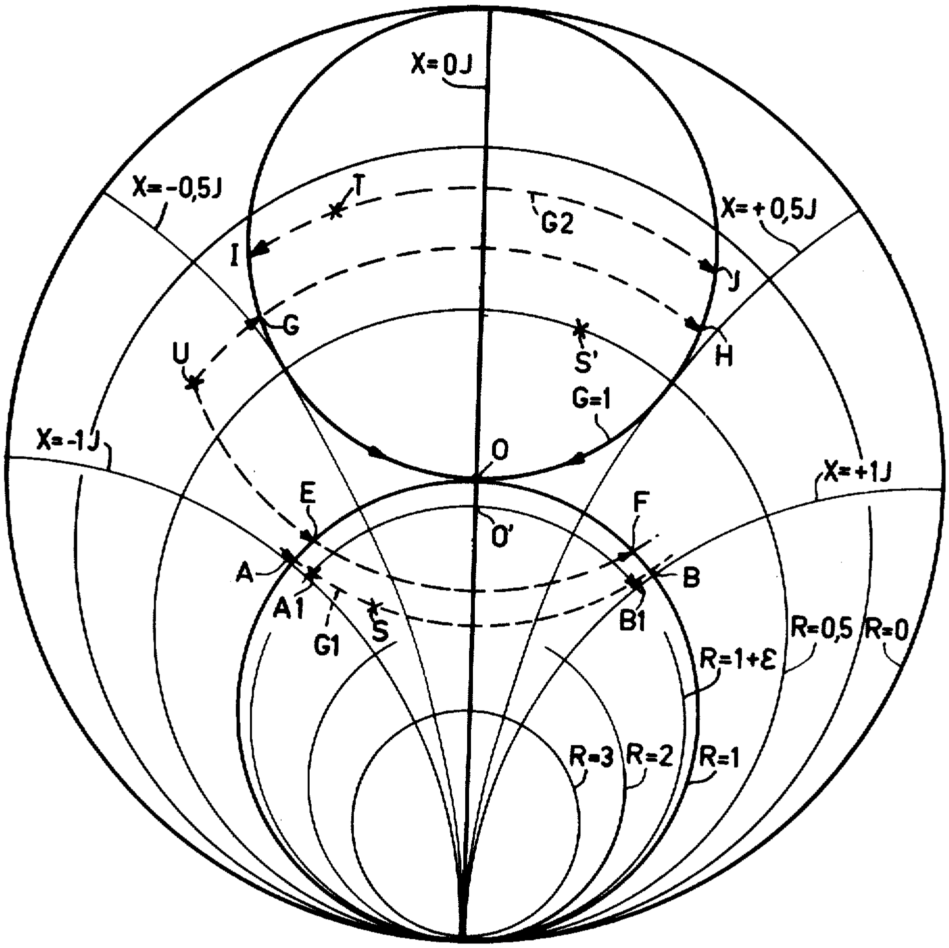
FIG. 2 is a Smith diagram for explaining the operation of the arrangement

The operation of the arrangement according to the invention will now be explained with reference to the Smith diagram shown in FIG. 2. In the explanation of the operation it is assumed that the length between the terminals 3 and 2 is negligible relative to the wavelength at which the arrangement is to operate.

In this diagram the impedances are reduced, that is to say, they are divided by the characteristic impedance $R_o$ of the cable providing for the connections between the transceiver and the aerial by means of an arrangement according to the invention.

Any impedance of the load network connected between the terminal 2 and ground can be shown in this diagram by a point which is the point of intersection of two circles one of which represents the real part of the impedance (circles R) and the other of which shows the imaginary part (circles X). The adaptation process is slightly different dependent on the position of these points.

A first case is considered when this point lies within the circle R = 1. Let us assume that S is this point which thus represents a reduced impedance $z$ characterized by:

$$G < 1 \text{ or } G = \mathcal{R}(1/z)$$

that is to say, the case where the conductance of the load network is lower than that of the transceiver which may also be characterized by $R > 1$ or $R = \mathcal{R}(z)$.

In this case the reactive element 6 is arranged in parallel with the load network; for the sake of clarity it is assumed that the reactance given by the element 5 is zero, that is to say, the impedance at the level of the terminal 3 is equal during the first control phase to that at the level of terminal 2. By varying the susceptance of the element 6 the point representing the impedance of the circuit arrangement of the load network connected in parallel with the element 6 describes a curve $G_1$. This curve $G_1$ has a circular shape which is obtained by the symmetry of the centre 0 (point defined by R = 1 and X = 0) of the circle R at which the point S' which is symmetrical to the point S with respect to 0 is located in this example on the circle R = 0.5.

The curve $G_1$ intersects the circle R = 1 at the points A and B. At one of these points the voltage provided by the resistance discriminator changes its sign so that a control signal is obtained for the switch 18 in such a manner that the element 6 maintains its value (the case where the elements 5 and 6 are inductors of the type mentioned hereinbefore). The choice of SA or SB is determined by the nature of the inductive or capacitive element or by the direction of variation of the susceptance.

To effect the final adaptation it is only necessary to vary the reactance of reactive element 5 so as to thereby vary the impedance which is represented by point A or point B, passing along the circular path AO or BO to arrive at an impedance which is close to the impedance represented by the point 0.

This variation of the reactance of the element 5 may be determined either by the conductance discriminator 9 or by the phase discriminator.

In a second case the point representing the impedance of the load network is located within the circle G = 1 (circle symmetrical to the circle R = 1 with respect to 0). When it is assumed that this point is T the impedance of the load network $zT$ is characterized by R <=, i.e., the case where the resistance of the load network is smaller than that of the transceiver and is also characterized by G > 1 or : G = R ($1/_{3T}$).

The element 6 is arranged in parallel with the series arrangement of the reactive element 5 and the load network so that the curve $G_2$ is followed when the reactance of this element 5 is varied. This curve $G_2$ has a circular shape $R = \mathcal{R}(3_T)$ intersecting the circle G = 1 at the points I and J. At these points the conductance discriminator 9 supplies a signal so that the reactance provided by the element 5 is fixed by means of the arrangement 16 at a suitable value so that the final adaptation can be continued with the aid of the reactive element 6. The point representing the impedance at the terminal 2 describes the curve IO or JO of the circle G = 1 as a function of the susceptance variation of the element 6 in accordance with the point I or J.

In the third and last case the point representing the impedance of the load network may be assumed to be located outside the two circles R = 1 and G = 1. When assuming that U is this point this impedance is characterized by G< 1 and R < 1. In this third case both modes of operation are suitable. Likewise as in the first case the value of the element 6 connecting the load circuit in parallel may be adjusted and in that case the circular shape UE or UF is described and subsequently the value of the element 5 may be adjusted and the circular shape EO or FO is described. Alternatively as in the second case the element 5 may be arranged in series with the load network. In that case the circular shape UG or UH is described and subsequently the element 6 may be adjusted which connects the circuit arrangment in parallel in which case the circular shape GO or HO is described.

It is to be noted that as a result of the invention the adjustments of the elements 5 and 6 are independent of each other. As soon as the first reactive element has been adjusted, the variation of the value of the second reactive element does not affect the value of the first reactive element.

In addition the values of the reactive elements may be arbitrary in their variation range at the commencement of the adaptation process.

In fact, in the first case the impedance at the level of terminal 3 differs from that at the level of the terminal 2 only by the reactance given by the element 5, i.e., the value of the real part of the impedance at terminal 2 is equal to the impedance at terminal 3. The susceptance given by the element 6 is varied until this real part is substantially equal to one, which is detected by the resistance discriminator.

In the second case an arbitrary value of the susceptance is given by the element 6 at the start of the first control phase because the conductance discriminator is only sensitive to the real part of the admittance at the level of the terminal 3 and this real part is not changed by the susceptance of the element 6.

The choice of the circuit arrangement for the third case facilitates the conception of the arrangement.

The use of the phase discriminator 11 which seems to be superfluous because the adaptation can be effected by the other two discriminators 9 and 10 is justified by the following considerations.

In practice the adaptation need not be perfect since a standing wave ratio of $\leq$ 1.5 on the transmission line connected to the output of the transceiver is permissible.

The resistance discriminator and the conductance discriminator cannot be very precise. As an example it is supposed that the first case is used and that the resistance discriminator which is not very precise provides a zero voltage when $R = 1 + \epsilon$, that is to say, that the points A1 or B1 are reached starting from the same point S. The variation of the reactance of the element 5 results in describing the circle $R = 1 + \epsilon$. The points on this circle do not have a common point with the circle $G = 1$, that is to say, the conductance discriminator which is adjusted for supplying a voltage for $G = 1$ or $G > 1$ will supply a voltage. There is no equilibrium point. A phase discriminator which is adjusted correctly renders it possible that the equilibrium point is shifted to the point 0′ ($R = 1 + \epsilon$, $X = 0$) and when it is misadjusted there will always be an equilibrium point located on the circle $R = 1 + \epsilon$ and it will be the closer to 0′ the more precise this phase discriminator is. Due to this phase discriminator calibration of the other two discriminators need not be precise.

In the preferred embodiment of the arrangement according to the invention a phase discriminator is used. As a result switches 15 and 19 may be coupled together and their positions are determined by the impedances present between the terminal 2 and ground. The switches 18 and 20 change positions between the first control phase and the second control phase.

Figure 3:
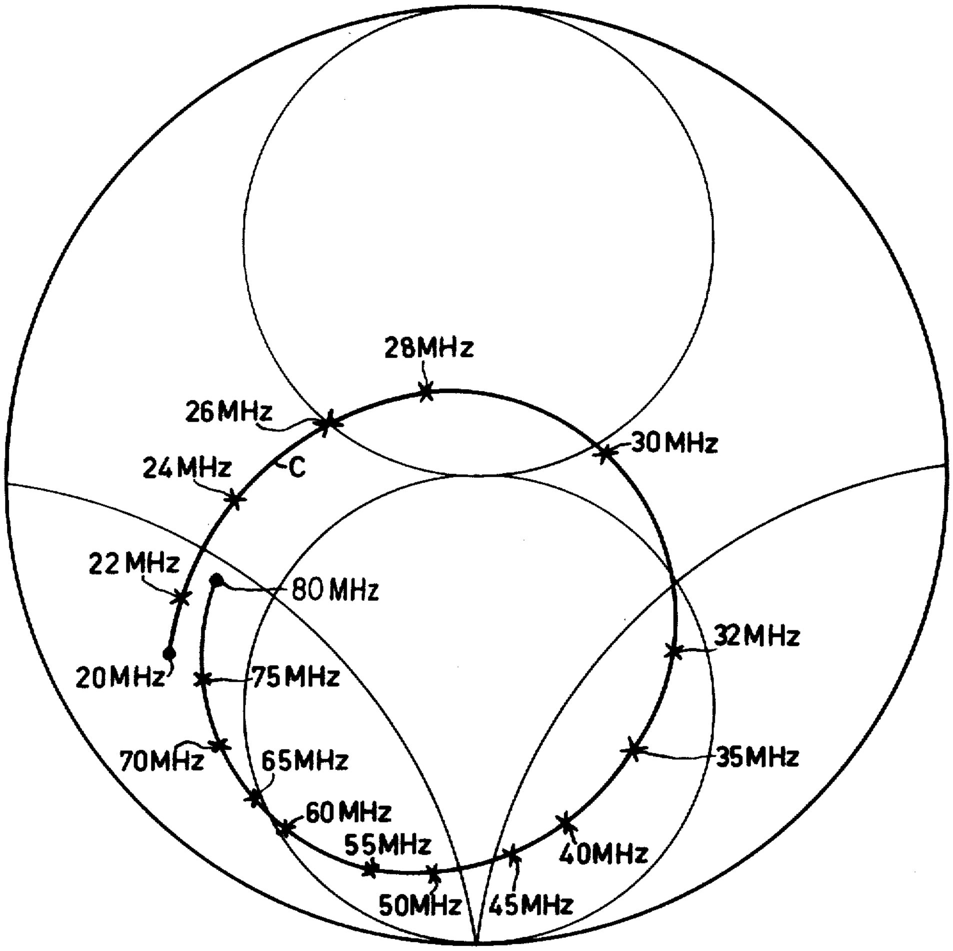
FIG. 3 shows the impedance curve of the aerial as a function of the frequency

FIG. 3 as an example shows a curve C illustrating the variation of the impedance of an aerial of the whip type as a function of the frequency for a range of between 20 and 80 MHz.

Figure 4:
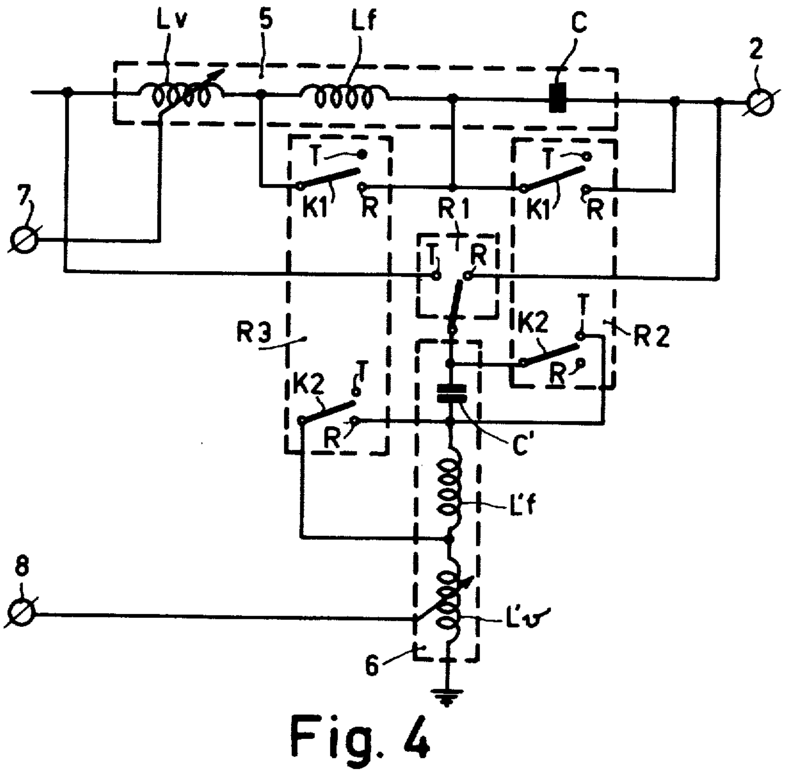
FIG. 4 shows a practical embodiment of an adaptation cell.

These different impedance values must be transformed by the load adaptor 4 into an impedance of substantially 50 Ohms. FIG. 4 shows a practical example of a load adaptor. In FIG. 1 and 4 like references denote like parts, save for the switch 15 in FIG. 1 which is denoted by $R_1$ in FIG. 4.

The reactive element 5 consists of a variable inductor Lv whose value varies between 0.1 and 0.7 $\mu$H in accordance with a voltage applied to the terminal 7 (this inductor may be, for example, a coil having a wiper driven by a motor operated by a voltage applied to the terminal 7), a fixed inductor $L_f$ whose value is 0.6 $\mu$H and a capacitor C of 33 pF, which components are arranged in series. A contact $k_1$ of a relay $R_2$ permits the capacitor C to be short-circuited. Likewise the inductor Lf may be short-circuited by a contact $k_1$ of a relay $R_3$.

The reactive element 6 includes a variable inductor L′v which is equal to the inductor Lv in series with an inductor $L'_f$ of 0.5 $\mu$H and in series with a capacitor C′ of 8.2 pF.

The contacts $k_2$ of the relays $R_2$ and $R_3$ permit of short-circuiting the capacitor C′ and the inductor $L'_f$.

In order to economize the current consumed by the relays for maintaining them in position T(operation) the contacts of the different relays are made in such a manner that there is a minimum number of relays in the position T while the others are in the position R(rest) independent of the arrangement for adapting the load network whose impedance variations are shown in FIG. 3.

The following Table shows the sub-regions and the associated positions of the switches used in the load adaptor shown in FIG. 4.

TABLE

| Sub-region of the frequency considered | Position of R1 | Position of R2 | Position of R3 |
|---|---|---|---|
| 20 to 25 MHz | T | R | T |
| 25 to 30 MHz | T | R | R |
| 30 to 40 MHz | R | R | R |
| 40 to 60 MHz | R | T | T |
| 60 to 80 MHz | R | T | R |

For a variable element (inductor Lv) it can be seen that it is possible to adapt substantially all impedances whose points are located in the Smith diagram provided that these variable reactive elements are combined with fixed reactive components (inductors and capacitors).

What is claimed is:

1. An arrangement for adapting a load network to a transceiver, comprising a load adaptor having a first and a second adjustable reactive element, switching means and at least a first and a second control means in which in the presence of a first information indicating at least the fact that the resistance of the load network is higher than that of the transceiver, the switching elements connect the first reactive element in series with the load network which is connected in parallel with the second reactive element and permit the second control means to vary the susceptance of the second reactive element during a first control phase until the real part of the impedance at the input terminal of the arrangement is substantially equal to the resistance of the transceiver, while during a second control phase a control means other than that used during the first control phase ensures the adjustment of the first reactive element, whereas in the presence of a second information indicating at least the fact that the conductance of the load network is higher than that of the transceiver the switching elements connect the second reactive element in parallel with the combination of the first reactive element which is in series with the load network and permit the first control means to vary the reactance of said first reactive element during the first control phase until the real part of the admittance at the input terminals of the arrangement is substantially equal to the conductance of the transceiver while during the second control phase a control means other than that used during the first phase ensures the adjustment of the second reactive element.

2. An adaptation circuit as claimed in claim 1, characterized in that the first control means is an admittance discriminator and the second control means is a resistance discriminator.

3. An adaptation circuit as claimed in claim 1, characterized in that it comprises a control means different from the first and second control means, said control means comprising a phase discriminator for use during the second phase.

4. An adaptation circuit as claimed in claim 1, characterized in that the adjustable reactive means are constituted by a circuit arrangement of reactive elements at least one of which is adjustable.

5. An arrangement as claimed in claim 1 wherein each of said reactive elements comprises a variable inductor.

6. An arrangement as claimed in claim 1 wherein each of said reactive elements comprises a series circuit including a variable inductor, a fixed inductor, and a fixed capacitor.

* * * * *